Patented July 13, 1954

2,683,750

UNITED STATES PATENT OFFICE 2,683,750

PURIFICATION OF VINYL ETHERS

Leo Philipp Ellinger, London, England, assignor to The British Oxygen Company Limited, London, England, a British company No Drawing. Application June 11, 1951, Serial No. 231,040

Claims priority, application Great Britain June 19, 1950

12 Claims. (Cl. 260—616)

The present invention relates to the purification of chemical compounds and more particularly to the purification of vinyl ethers produced by the vinylation of alcohols of the $C_4$–$C_8$ range.

In the vinylation of alcohols with acetylene in the presence of a suitable catalyst such as caustic potash, a crude product is obtained comprising a mixture of the alkyl vinyl ether formed with residual alcohol, together with small amounts of the corresponding dialkyl acetal and water and traces of other minor impurities. Distillation of this crude reaction product leads to the formation of azeotropes containing between 75 and 95% of the ether depending on the particular alcohol used, the remainder being residual alcohol.

In the case of the lower alkyl vinyl ethers (i. e. those in which the alkyl group contains 4 or less carbon atoms) it has been proposed to remove the alcohol from the azeotrope by washing with water in which $C_1$–$C_3$ alcohols are completely soluble and the $C_4$ alcohols are appreciably soluble, whilst the corresponding alkyl vinyl ethers are substantially insoluble. Such a process cannot however be used for alcohols in the $C_5$–$C_8$ range, owing to their reduced water solubility which decreases rapidly with increasing molecular weight of the alcohol; its application is not really satisfactory even in the case of the $C_4$ alcohols where the solubility in water, though appreciable, is incomplete.

In order to extend this process to the $C_4$–$C_8$ alcohols, it is necessary to use a solvent other than water and one which must possess the following properties:

1. The solvent and alcohol must exert a large mutual solubility and preferably be completely miscible.
2. The solvent and the vinyl ether must possess very small mutual solubilities.
3. The partition of the alcohol between the vinyl ether and the scrubbing solvent must be such as to give higher concentrations of the alcohol in the scrubbing solvent.
4. The solvent must not react chemically with either the vinyl ether or the alcohol at room temperature or at its boiling point.
5. There should be an appreciable difference in specific gravity between the solvent and the vinyl ether to allow for ready separation of the two phases obtained on mixing.
6. It would be advantageous if complete recovery of dissolved alcohol (and any vinyl ether taken into solution with it from the solvent) were readily obtainable, and if the solvent itself were readily recoverable after use to be used again.

In copending application Serial No. 176,059, filed April 26, 1950, by Leo Philipp Ellinger, now Patent No. 2,641,616, it has been stated that solvents to satisfy the above requirements can be prepared in the form of highly concentrated aqueous solutions of the salts of alkali metals with phenol itself or the lower alkylphenols, and it has been proposed to use such solutions for the purpose of purifying vinyl ethers of alcohols of the $C_4$–$C_8$ range.

It has now been found that solvents to satisfy the above requirements can also be prepared in the form of highly concentrated aqueous solutions of salts of alkali or alkaline earth metals with acids of the formula $C_nH_{2n}O_2$ where $n$ is 3–8, or with benzoic acid, or with the aromatic acids of formula $C_8H_8O_2$.

According to the present invention, therefore, in the preparation of a vinyl ether by vinylating an alcohol of the $C_4$–$C_8$ range, the step of reducing the alcohol content of a mixture containing the vinyl ether and its corresponding alcohol comprises treating the mixture with an aqueous solution of the salt of an alkali or alkaline earth metal with an acid of the formula $C_nH_{2n}O_2$ where $n$ is 3–8, or with benzoic acid, or with an aromatic acid of formula $C_8H_8O_2$, said solution containing at least 20% by weight of the salt, to form a solution of the alcohol therein, and subsequently separating the alcohol solution so formed.

The operative concentration of the salt in the aqueous solution should be at least 2 N, and preferably above 6 N where such concentrated solutions can be obtained.

Examples of suitable solutions include the following:

8 N sodium propionate, 5.5 N sodium butyrate, 6.4 N potassium butyrate, 6.3 N sodium isobutyrate, 2.4 N sodium caprylate, 2.4 N sodium benzoate, 0.8 N calcium butyrate and 1.25 N barium butyrate.

The mixture treated may be the crude product obtained on vinylation but it is preferably to distil such crude product to obtain a mixture of vinyl ether and alcohol having a vinyl ether content equal or almost equal to that corresponding to the azeotrope and then to treat such mixture with the solvent.

The purification procedure can be carried out as a batch process in which the solvent and mixture of vinyl ether and alcohol are agitated together, the lower (aqueous) layer removed, and the upper (vinyl ether) layer treated with a quantity of fresh solvent, and the process repeated until the desired degree of removal of alcohol has been achieved. It may then be advantageous to wash the purified vinyl ether with water, to remove the small amounts of salts that may have become dissolved or suspended in the vinyl ether, and then to submit it to a final drying. Such drying can be carried out with any common drying agent with the exception of such drying agents as might give rise to acidity, since these might cause polymerisation of the vinyl ether. An example of a suitable drying agent is solid potassium hydroxide. Alternatively, the drying can be achieved by the partial distillation of the vinyl ether, since the water contained will be entrained with the first portions of the distillate, from which it can readily be separated. Such a drying process could also be readily adapted to operate continuously.

Removal of the alcohol from the mixtures of the vinyl ether and alcohol can also be effected by using any of the continuous processes of extraction in general use. Thus the solvent can be fed continuously near to the top of a tower containing packing material, such as Raschig rings, and the mixture fed continuously somewhere near to the bottom of the same tower. Solvent charged with alcohol and a smaller amount of vinyl ether is continuously withdrawn from the bottom of the tower and its alcohol and vinyl ether content recovered by distillation. Purified vinyl ether is continuously withdrawn from the top of the tower, and it may then if desired be further purified, for example by washing with water and drying in the manner outlined above. In operating such a counter-current scrubbing unit, it has been found to be highly advantageous to employ a small amount of a surface-active agent, such as an alkyl eryl sulphonate, a long chain alkyl sulphate, an alkyl aryl polyglycol ether, or the like. This material assists the wetting of the packing by the solvent and the mixing of the solvent and the vinyl ether; it is of course essential that the amount of such agent used be limited and controlled, so that emulsification of the two phases, with consequent difficulties in separation, be avoided.

In the recovery of the alcohol removed and any of the vinyl ether accompanying it, the spent solvent is distilled, giving a distillate in two layers of which the upper layer is the desired mixture of alcohol and vinyl ether. The lower layer consists substantially of water.

The invention is illustrated by the following examples:

Example 1

149 g. of a mixture of isoamyl vinyl ether and isoamyl alcohol containing 88.7% of the vinyl ether was shaken 3 times successively with batches each of 150 g. of 8 N aqueous sodium propionate, then with small amounts of 5% aqueous caustic soda and finally with water, and then distilled. The distillate contained at least 97.4% of isoamyl vinyl ether

Example 2

150 g. of a mixture of isoamyl vinyl ether and isoamyl alcohol containing 83.9% of the vinyl ether was shaken 4 times successively with equal weights of 5.5 N aqueous sodium butyrate. The product was shaken twice with small amounts of water, and then distilled. 117 g. of distillate was obtained which contained 98.5% of isoamyl vinyl ether. Distillation of the combined sodium butyrate solutions in steam gave 27 g. of a mixture of isoamyl vinyl ether and isoamyl alcohol containing 33.8% of the vinyl ether.

Example 3

100 g. of a mixture of isoamyl vinyl ether and isoamyl alcohol containing 78.5% of the vinyl ether was shaken 3 times successively with a 20% aqueous solution of calcium butyrate, using 100 g. each time. The product was washed 3 times with small quantities of 1% aqueous sodium carbonate, and then distilled. The distillate contained 92% of isoamyl vinyl ether.

Example 4

90 g. of a mixture of isoamyl vinyl ether and isoamyl alcohol containing 78.5% of isoamyl vinyl ether was shaken 3 times successively with an aqueous solution containing 35% of barium butyrate, using 90 g. each time. The product was washed several times with successive small amounts of 1% aqueous sodium carbonate, and was then distilled. The distillate contained 96% of isoamyl vinyl ether.

Example 5

206 g. of a mixture of 2-ethylbutyl vinyl ether and 2 ethylbutyl alcohol containing 67.8% of the vinyl ether was washed 6 times successively with 5 N aqueous sodium butyrate, using 200 g. each time. The product was then washed twice with small amounts of water and distilled. The distillate amounted to 164 g. and contained 95.7% of vinyl ether.

Example 6

100 g. of a mixture of isoamyl vinyl ether and isoamyl alcohol containing 86.7% of the vinyl ether was shaken 4 times successively with 6.4 N aqueous potassium butyrate, using 100 g. each time. The product was washed with a small amount of water and then distilled, giving 80 g. containing 98.9% of the vinyl ether.

Example 7

150 g. of a mixture of isoamyl vinyl ether and isoamyl alcohol containing 84.7% of the vinyl ether was shaken 3 times successively with 6.3 N aqueous sodium isobutyrate, using 150 g. each time. The product was washed with a small amount of aqueous caustic soda and then water, and distilled. The distillate contained 95.9% of the vinyl ether.

Example 8

150 g. of mixture of isoamyl vinyl ether and isoamyl alcohol containing 84.7% of the vinyl ether was shaken with its own weight of 2.4 N aqueous sodium caprylate. After treatment with 5% aqueous caustic soda and distillation 112 g. of product containing 95.5% of the vinyl ether was obtained.

Example 9

313 g. of a mixture of isoamyl vinyl ether and isoamyl alcohol containing 82.4% of the vinyl ether was shaken with 458 g. of a saturated aqueous solution of sodium benzoate. The product was washed with a small amount of water and distilled, giving 281 g. containing 96.7% of the vinyl ether.

I claim:

1. A process for reducing the alcohol content of a mixture of a vinyl ether of the $C_4$–$C_8$ range with its corresponding alcohol, obtained in the preparation of the vinyl ether by vinylation of the alcohol, said process comprising treating the mixture with an aqueous solution of a substance chosen from the group consisting of the salts of alkali metals and alkaline earth metals with acids of the formula $C_nH_{2n}O_2$ where $n$ is 3–8, with benzoic acid and with aromatic acids of the formula $C_8H_8O_2$, said aqueous solution containing at least 20% of the salt, whereby a solution of the alcohol in the aqueous solution is obtained, and thereafter separating said alcohol solution from the vinyl ether.

2. Process according to claim 1 wherein the process is carried out batchwise.

3. Process according to claim 1 wherein the process is carried out continuously.

4. A process for reducing the alcohol content of a mixture of a vinyl ether of the $C_4$–$C_8$ range with its corresponding alcohol, obtained in the preparation of the vinyl ether by the vinylation of the alcohol, said process comprising treating the mixture with an aqueous solution of a substance chosen from the group consisting of sodium and potassium butyrate and isobutyrate, said aqueous solution containing at least 20% by weight of the salt, whereby a solution of the alcohol in the aqueous solution is obtained, and thereafter separating said alcohol solution from the vinyl ether.

5. Process according to claim 4 wherein the process is carried out batchwise.

6. Process according to claim 4 wherein the process is carried out continuously.

7. A process for reducing the alcohol content of a mixture of a vinyl ether of the $C_4$–$C_8$ range with its corresponding alcohol, obtained in the preparation of the ether by vinylation of the alcohol, said mixture having a vinyl ether content substantially equal to that corresponding to the vinyl ether/alcohol azeotrope, said process comprising treating the mixture with an aqueous solution of a substance chosen from the group consisting of the salts of alkali metals and alkaline earth metals with acids of the formula $C_nH_{2n}O_2$ where $n$ is 3–8, with benzoic acid and with aromatic acids of the formula $C_8H_8O_2$, said aqueous solution containing at least 20% of the salt, whereby a solution of the alcohol in the aqueous solution is obtained, and thereafter separating said alcohol solution from the vinyl ether.

8. Process according to claim 7 wherein the process is carried out batchwise.

9. Process according to claim 7 wherein the process is carried out continuously.

10. A process for reducing the alcohol content of a mixture of a vinyl ether of the $C_4$–$C_8$ range with its corresponding alcohol, obtained in the preparation of the ether by vinylation of the alcohol, said mixture having a vinyl ether content substantially equal to that corresponding to the vinyl ether/alcohol azeotrope, said process comprising treating the mixture with an aqueous solution of a substance chosen from the group consisting of sodium and potassium butyrate and isobutyrate, said aqueous solution containing at least 20% by weight of the salt, whereby a solution of the alcohol in the aqueous solution is obtained, and thereafter separating said alcohol solution from the vinyl ether.

11. Process according to claim 10 wherein the process is carried out batchwise.

12. Process according to claim 10 wherein the process is carried out continuously.

References Cited in the file of this patent

UNITED STATES PATENTS

| Number | Name | Date |
|---|---|---|
| 2,021,869 | Reppe et al. | Nov. 19, 1935 |
| 2,315,182 | Bemmann | Mar. 30, 1943 |
| 2,546,431 | Collardeau | Mar. 27, 1951 |
| 2,579,411 | Adelman | Dec. 18, 1951 |

OTHER REFERENCES

Latimer et al., Reference Book of Inorganic Chemistry, page 271 (1940), published by MacMillan Co., New York, N. Y.

Lange, Handbook of Chemistry, 6th ed., pp. 170, 172, 253, and 254, published by Handbook Publishers, Inc., Sandusky, Ohio (1946).